(12) United States Patent
Terruzzi et al.

(10) Patent No.: US 8,781,282 B2
(45) Date of Patent: Jul. 15, 2014

(54) OPTICAL FIBER WITH DOUBLE COATING

(75) Inventors: Lidia Terruzzi, Milan (IT); Silvio Frigerio, Milan (IT); Giovanni Villani, Milan (IT)

(73) Assignee: Prysmian S.p.A., Milan (IT)

( * ) Notice: Subject to any disclaimer, the term of this patent is extended or adjusted under 35 U.S.C. 154(b) by 227 days.

(21) Appl. No.: 13/511,932

(22) PCT Filed: Nov. 26, 2009

(86) PCT No.: PCT/EP2009/065888
§ 371 (c)(1),
(2), (4) Date: Aug. 16, 2012

(87) PCT Pub. No.: WO2011/063838
PCT Pub. Date: Jun. 3, 2011

(65) Prior Publication Data
US 2012/0321265 A1    Dec. 20, 2012

(51) Int. Cl.
*G02B 6/036* (2006.01)
*G02B 6/02* (2006.01)
(52) U.S. Cl.
USPC ............................ 385/128; 385/123; 385/127
(58) Field of Classification Search
USPC .................................................. 385/127, 128
See application file for complete search history.

(56) References Cited

U.S. PATENT DOCUMENTS

| 4,474,830 | A | 10/1984 | Taylor |
| 4,525,026 | A | 6/1985 | Elion |
| 5,214,734 | A | 5/1993 | Inniss et al. |
| 5,502,145 | A * | 3/1996 | Szum ............................... 528/28 |
| 5,558,937 | A | 9/1996 | Woods et al. |
| 5,595,820 | A * | 1/1997 | Szum ............................ 428/378 |
| 5,664,041 | A * | 9/1997 | Szum ............................ 385/128 |
| 5,904,983 | A * | 5/1999 | Chan et al. .................... 428/392 |
| 8,189,979 | B2 * | 5/2012 | Debut et al. .................... 385/128 |
| 2009/0274424 | A1 | 11/2009 | Debut et al. |
| 2012/0321265 | A1 * | 12/2012 | Terruzzi et al. ............... 385/128 |

FOREIGN PATENT DOCUMENTS

| EP | 1 112 979 A1 | 7/2001 |
| WO | WO 99/26891 A1 | 6/1999 |
| WO | WO 2007/073754 A1 | 7/2007 |
| WO | WO 2008/037291 A1 | 4/2008 |

OTHER PUBLICATIONS

International Search Report from the European Patent Office for International Application No. PCT/EP2009/065888, mailing date Nov. 9, 2010.

* cited by examiner

*Primary Examiner* — Rhonda Peace
(74) *Attorney, Agent, or Firm* — Finnegan, Henderson, Farabow, Garrett & Dunner, L.L.P.

(57) ABSTRACT

An optical fiber includes an optical waveguide, a first coating layer disposed to surround the optical waveguide and a second coating layer disposed to surround the first coating layer, wherein the first coating layer is formed by a cured polymeric material obtained by curing a radiation curable composition including at least one (meth)acrylate monomer esterified with at least one branched alcohol having from 9 to 12 carbon atoms, and the second coating layer is formed by a cured polymeric material obtained by curing a radiation curable (meth)acrylate composition including from 0.8% to 1.5% by weight of silica, based on the total weight of the composition.

14 Claims, 2 Drawing Sheets

US 8,781,282 B2

OPTICAL FIBER WITH DOUBLE COATING

CROSS REFERENCE TO RELATED APPLICATIONS

This application is a national phase application based on PCT/EP2009/065888, filed Nov. 26, 2009, the content of which is incorporated herein by reference.

FIELD OF THE INVENTION

The present invention relates to an optical fiber with a double coating.

More in particular, the present invention relates to an optical fiber with a double coating comprising a glass core inside which the optical signal is transmitted, an inner primary coating made of a crosslinked polymeric material comprising acrylates from branched $C_9$-$C_{12}$ alcohols, and an outer secondary coating made of a crosslinked polymeric material comprising a predetermined amount of silica.

BACKGROUND ART

Optical fibers commonly comprises a glass core (typically with a diameter of about 120-130 μm), inside which the transmitted optical signal is confined, surrounded by a cladding, preferably made of glass. The combination of core and cladding is usually identified as "optical waveguide", and is usually produced by chemical reactions according to known processes, such as those known as VAD, OVD, PCVD or MCVD. The optical waveguide is generally protected by an outer coating, typically of polymeric material. This protective coating can comprise a first coating layer positioned directly onto the glass surface, also known as the "primary coating", and a second coating layer, also known as "secondary coating", disposed to surround said first coating layer.

These polymer coatings may be obtained from compositions comprising oligomers and monomers that are generally crosslinked by means of UV irradiation in the presence of a suitable photo-initiator. The two coatings described above differ, inter alia, in the mechanical properties of the respective materials.

The material which forms the primary coating is a relatively soft material, with a relatively low modulus of elasticity at room temperature (typically of from 1 MPa to 2 MPa), in order to cushion the glass core and to avoid the microbending phenomena, which attenuate the optical signal and reduce the signal transmission capability of the glass fiber.

The material which forms the secondary coating is relatively harder, having higher modulus of elasticity values at room temperature (typically of from 500 MPa to 2000 MPa), to confer a good mechanical resistance of the optical fiber to the external stress during the installation and working conditions.

U.S. Pat. No. 5,214,734 describes optical fibers which include polymeric jackets for environmental protection and protection against handling. By adding particles of an appropriate material to the polymeric jacket material of an optical fiber, it is possible, to at least some extent, to protect the fiber from loss of strength which is related to exposure of the fiber to moisture. At least one primary and/or secondary layer is filled with particulate, e.g. fumed, silica. The silica-filled layer may be the sole layer of the jacket, as is currently preferred, or, alternatively, it may be any layer or layers of a multiple-layer jacket. About 0.5%-1% silica by weight is sufficient to bring about an increase in the onset of accelerated fatigue when added to the exemplary prepolymer material.

U.S. Pat. No. 5,558,937 discloses a curable thiol-ene composition, specially adapted for use as a primary coating on optical fibers, which comprises a polythiol and a compound having a plurality of norbornene groups thereon, characterized in that one of either the compound having the plurality of norbornene groups or the polythiol has a backbone of a poly (tetramethylene oxide), or is an oligomer thereof, and the poly(tetramethylene oxide) has a molecular weight of between 250 and 5,000. The formulations can be cured using low intensity UV lamps. The cured products are reported to have excellent low temperature flexibility, good humidity and water absorption resistance and good thermal oxidative stability.

No indication is provided about the behavior of the optical fiber in a hot, damp environment. No indication is provided about the composition of the secondary (outer coating).

U.S. Pat. No. 4,525,026 discloses an optical fiber having a single or double coating, wherein the light transmitting fiber is surrounded with one or more protective layers which contain finely divided particles. The particles are typically of a metal or metal oxide matching the metal or metal oxide constituent of the outer portions of the optical fiber itself and are typically suspended in the polymeric, buffering layer directly surrounding the optical fiber. In a particular embodiment a protective material (metallic aluminum, tin oxide and titanium oxide) is put between the cladding and the buffer material in order to saturate or neutralize the environmental fluids before they reach the fiber.

The presence of a protective material layer implies a further manufacturing step and additional costs also due to the necessity of having an oxide with a high degree of purity.

SUMMARY OF THE INVENTION

The Applicant has noticed that the technical solutions above are able to protect the optical fiber against a bending stress up to 3 GPa with a life time of a few hours, without any evidence of improvement over time of resistance to stress fatigue corrosion, especially at small bending radius, particularly in damp heat conditions.

In particular, the Applicant tested optical fibers having a second (secondary) coating containing various amount of silica and found that the improvement of the optical fiber behavior under the above mentioned challenging conditions was unsatisfactory.

The Applicant than focused on the first (primary) coating material, testing optical fibers with different materials at the said conditions, but the results were unsatisfactory as well.

The Applicant surprisingly found that a specific combination of a first coating having a peculiar composition and a second coating comprising a predetermined amount of silica provided the optical fiber with the sought resistance in damp heat conditions, even when subjected to low bending radius (fatigue resistance).

According to a first aspect, the present invention relates to an optical fiber comprising an optical waveguide, a first coating layer disposed to surround said optical waveguide and a second coating layer disposed to surround said first coating layer, wherein said first coating layer is based on a cured polymeric material obtained by curing a radiation curable composition comprising at least one (meth)acrylate monomer esterified with at least one branched alcohol having from 9 to 12 carbon atoms, and said second coating layer is formed by a cured polymeric material obtained by curing a radiation curable (meth)acrylate composition comprising from 0.8% to 1.5% by weight of silica, based on the total weight of the composition.

The Applicant has found that the double coating optical fiber according to the present invention has a good resistance to mechanical stresses and to the aging.

In particular, the Applicant has found that the double coating optical fiber according to the present invention has an improved fatigue resistance, even in environmental conditions of high temperature and high relative humidity.

Advantageously, the Applicant has found that the double coating optical fiber according to the present invention has reduced number of cracks and/or failures when wound with a highly reduced bending radius (up to 2 mm).

Moreover, the Applicant has found that the double coating optical fiber according to the present invention has a higher average lifetime also in environmental conditions of high temperature and relative humidity.

Further, the Applicant has found that the double coating optical fiber according to the present invention shows improvement over time of the resistance to static fatigue resistance (stress corrosion susceptibility measured by static mandrel test, as shown in the following).

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The optical cable of the present invention, thanks to the resistance to environmentally challenging conditions, such as prolonged bending at high temperature and/or moisture, are advantageously deployed in fiber-to-the-premises (FTTx) application often requiring low bend loss of optical signals transmitted through the fibers, also under stringent installation constraints that may impose tight bend radii, e.g., due to tighter corning in buildings or compression of optical fibers, and where heat and/or damp can easily affect the optical fiber cables positioned, e.g., in thin walls and or in the vicinity of power cable or of water conduits.

The optical fibers of the cable of the invention can comprise optical fibers provided with a colored layer for distinguishing purposes. The colored layer can be an ink layer, having a thickness typically of between about 2 μm and about 10 μm, provided in radially external position with respect to the second coating layer. Alternatively, a coloring agent can be added to the second coating material without altering the characteristics thereof.

DESCRIPTION OF PREFERRED EMBODIMENTS

Figure 1:
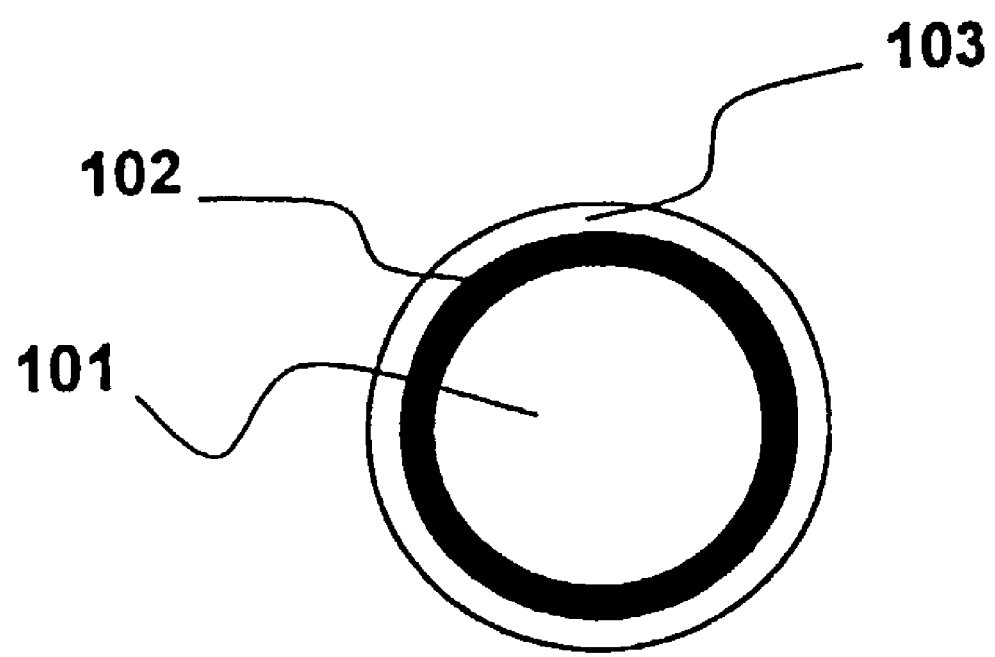
FIG. 1 shows a schematic cross-section of an optical fiber according to the invention.

As shown in FIG. 1, an optical fiber according to the invention comprises an optical waveguide 101, a first polymeric coating layer 102, also known as primary coating, disposed to surround said optical waveguide and a second polymeric coating layer 103, also known as secondary coating, disposed to surround said first polymeric layer.

As mentioned above, an optical fiber according to the present invention comprises a first coating layer (primary coating) formed by a cured polymeric material obtained by curing a radiation curable composition comprising at least one (meth)acrylate esterified with at least one branched alcohol having from 9 to 12 carbon atoms.

Radiation-curable compositions suitable for forming a radiation curable composition to be used as primary coating in an optical fiber according to the invention contain one or more radiation-curable oligomers or monomers (reactive diluents) having at least one functional group capable of polymerization when exposed to actinic radiation. Commonly, the radiation-curable functionality used is ethylenic unsaturation, which can be polymerized preferably through radical polymerization. Preferably, at least about 80 mole %, more preferably, at least about 90 mole %, and most preferably substantially all of the radiation-curable functional groups present in the oligomer are acrylate or methacrylate.

For the sake of simplicity, the term "(meth)acrylate" as used throughout the present application covers both acrylate and methacrylate functionality.

The radiation curable composition for obtaining the first coating layer of the optical fiber of the present invention preferably comprises (i) at least one (meth)acrylate monomer esterified with at least one branched alcohol having from 9 to 12 carbon atoms, and (ii) a radiation curable urethane(meth)acrylate oligomer, preferably comprising a backbone derived from a polyalkylene glycol and a dimer acid based polyester polyol.

The (meth)acrylate monomer (i) can be mono- and/or multi-functional, i.e., can have one or more (meth)acrylate functional group capable of copolymerizing when exposed to actinic radiation with the other components of the radiation curable composition. Preferably a plurality of (meth)acrylate monomers (i) are present in the composition of the first coating layer.

The branched alcohol having from 9 to 12 carbon atoms can be aliphatic, alicyclic, or aromatic alcohols, preferably aliphatic. Preferably said alcohol has from 10 to 11 carbon atoms. Preferably, said alcohol has at least two methyl moieties branching from the carbon chain. Preferably said alcohol has an isomeric structure.

Useful examples of monofunctional (meth)acrylate useful in the present invention are nonyl(meth)acrylate, decyl(meth)acrylate, undecyl(meth)acrylate, dodecyl(meth)acrylate, isodecyl(meth)acrylate, isobornyl(meth)acrylate, bornyl(meth)acrylate, cyclohexylbutyl(meth)acrylate cyclohexylpentyl(meth)acrylate, cyclohexylhexyl(meth)acrylate, 2-hydroxydecyl(meth)acrylate, dimethyloctyl(meth)acrylate, trimethyloctyl(meth)acrylate, 2,6-dimethylheptan-4-yl(meth)acrylate, 3,5,5-trimethylhexan-1-yl(meth)acrylate, 6,8-dimethylnonan-2-yl(meth)acrylate, 5,7,7-trimethyloctan-1-yl(meth)acrylate, 2,4,4-trimethylheptan-3-yl(meth)acrylate arylbutyl(meth)acrylate, arylpentyl(meth)acrylate, arylhexyl(meth)acrylate, and the like.

The radiation-curable primary coating composition comprises from about 1 to about 80 wt. % of at least one (meth)acrylate monomer esterified with at least one branched alcohol having from 9 to 12 carbon atoms. Preferred amounts of the (meth)acrylate monomer include from about 10 to about 60 wt. %, more preferably from about 20 to about 55 wt. %, even more preferred ranging from 25 to 40 wt. %, based on the total weight of the coating composition.

The oligomer (ii) can be made according to methods well known in the art. Preferably, the urethane(meth)acrylate oligomer can be prepared by reacting (A1) the polyalkylene glycol, and
(A2) the dimer acid based polyester polyol,
(B) a polyisocyanate, and
(C) a (meth)acrylate containing a hydroxyl group.

Given as examples of the process for manufacturing the urethane acrylate by reacting these compounds are (i) reacting (A1) and (A2), (B), and (C) altogether; or
(ii) reacting (A1) and (A2) and (B), and reacting the resulting product with (C); or
(iii) reacting (B) and (C), and reacting the resulting product with (A1) and (A2); or
(iv) reacting (B) and (C), reacting the resulting product with (A1) and (A2), and reacting (C) once more.

Polyalkylene glycol (A1)—as used herein—is meant to refer to a polyalkylene glycol comprising composition having a plurality of polyalkylene glycol moieties. Preferably, said polyalkylene glycol has on average a number average molecular weight ranging from 500 to 15,000, more preferably ranging from 1,000 to 8,000, even more preferred from 1,500 to 6,000, and most preferred from 2,000 to 4,500. According to a preferred embodiment, the amount of unsaturation (referred to the meq/g unsaturation for the total composition) of said polyalkylene glycol is less than 0.01 meq/g, more preferably of from 0.0001 to 0.009 meq/g.

Polyalkylene glycol includes 1,2-polypropylene glycol, 1,3-polypropylene glycol, 1,4-polytetramethylene glycol, 2-methyl-1,4-polytetramethylene glycol, 3-methyl-1,4-polytetramethylene glycol, and mixtures thereof, with 1,4-polytetramethylene glycol being preferred.

Suitable polypropylene glycols are commercially available under the trade names of, for example, Voranol™ P1010, P 2001 and P 3000 (supplied by Dow), Lupranol® 1000 and 1100 (supplied by Elastogran), ACCLAIM® 2200, 3201, 4200, 6300, 8200, and Desmophen® 1111 BD, 1112 BD, 2061 BD, 2062 BD (all manufactured by Bayer), and the like.

Suitable polytetramethylene glycols are commercially available under the trade names of, for example, Polymeg® 1000, 1020, 2000, and 2010 (supplied by LyondellBasell), Teracol™ 1000 and 2000 (supplied by DuPont), Terathane® 1000 and 2900 (supplied by Invista), and the like. The urethane compounds may be formed by any reaction technique suitable for such purpose.

Dimer acid based polyester polyol (A2)—as used herein—is meant to refer to a hydroxyl-terminated polyester polyol which has been made by polymerizing an acid-component and a hydroxyl-component and which has dimer acid residues in its structure, wherein said dimer acid residues are residues derived from the use of a dimer acid as at least part of the acid-component and/or by the use of the diol derivative of a dimer acid as at least part of the hydroxyl-component.

Dimer acids (and esters thereof) are a well known commercially available class of dicarboxylic acids (or esters). They are normally prepared by dimerizing unsaturated long chain aliphatic monocarboxylic acids, usually of 13 to 22 carbon atoms, or their esters (e.g. alkyl esters). The dimerization is thought by those in the art to proceed by possible mechanisms which include Diels-Alder, free radical, and carbonium ion mechanisms. The dimer acid material will usually contain 26 to 44 carbon atoms. Particularly, examples include dimer acids (or esters) derived from C-18 and C-22 unsaturated monocarboxylic acids (or esters) which will yield, respectively, C-36 and C-44 dimer acids (or esters). Dimer acids derived from C-18 unsaturated acids, which include acids such as linoleic and linolenic are particularly well known (yielding C-36 dimer acids).

The dimer acid products will normally also contain a proportion of trimer acids (e.g. C-54 acids when using C-18 starting acids), possibly even higher oligomers and also small amounts of the monomer acids. Several different grades of dimer acids are available from commercial sources and these differ from each other primarily in the amount of monobasic and trimer acid fractions and the degree of unsaturation.

Usually the dimer acid (or ester) products are, as initially formed, unsaturated. Such unsaturation could possibly be detrimental to their oxidative stability by providing sites for crosslinking or degradation, and so resulting in changes in the physical properties of the coating films with time. It is therefore preferable (although not essential) to use dimer acid products which have been hydrogenated to remove a substantial proportion of the unreacted double bonds.

Herein the term "dimer acid" is used to collectively indicate both the diacid material itself and ester-forming derivatives thereof (such as lower alkyl esters) which would act as an acid component in polyester synthesis and includes (if present) any trimer or monomer.

The dimer acid based polyester polyol preferably has on average a number average molecular weight ranging from 1,000 to 13,000, more preferably ranging from 1,500 to 8,000, even more preferred from 2,000 to 6,000, and most preferred from 2,500 to 4,000.

Examples of these dimer acid based polyester polyols are given in EP 0 539 030. As commercially available products, Priplast™ 3190, 3191, 3192, 3195, 3196, 3197, 3198, 1838, 2033 (manufactured by Uniqema), and the like can be given.

The ratio of polyalkylene glycol to dimer acid based polyester polyol in the oligomer may be ranging from 1:5 to 5:1, preferably ranging from 1:4 to 4:1, and more preferably ranging from 1:2 to 2:1, even more preferably, polyalkylene glycol and dimer acid based polyester polyol are present in an equimolar ratio.

Given as examples of the polyisocyanate (B) are 2,4-tolylene diisocyanate, 2,6-tolylene diisocyanate, 1,3-xylylene diiso-cyanate, 1,4-xylylene diisocyanate, 1,5-naphthalene diisocyan-ate, m-phenylene diisocyanate, p-phenylene diisocyanate, 3,3'-dimethyl-4,4'-diphenylmethane diisocyanate, 4,4'-diphenyl-methane diisocyanate, 3,3'-dimethylphenylene diisocyanate, 4,4'-biphenylene diisocyanate, 1,6-hexane diisocyanate, iso-phorone diisocyanate, methylenebis(4-cyclohexylisocyanate), 2,2,4-trimethylhexamethylene diisocyanate, bis(2-isocyan-atethyl)fumarate, 6-isopropyl-1,3-phenyl diisocyanate, 4-di-phenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred isocyanates are tolylene di-isocyanate, isophorone di-isocyanate, and methylene-bis(4-cyclohexylisocyanate). Most preferred are wholly aliphatic based polyisocyanate compounds, such as isophorone diisocyanate.

Examples of the hydroxyl group-containing (meth)acrylate (C) include, (meth)acrylates derived from (meth)acrylic acid and epoxy and (meth)acrylates comprising alkylene oxides, more in particular, 2-hydroxyethyl(meth)acrylate, 2-hydroxypropyl-acrylate and 2-hydroxy-3-oxyphenyl (meth)acrylate. Acrylate functional groups are preferred over methacrylates.

The ratio of the glycol (A1), the polyol (A2), the polyisocyanate (B), and the hydroxyl group-containing (meth)acrylate (C) used for preparing the urethane(meth)acrylate is determined so that 1.1 to 3 equivalents of an isocyanate group included in the polyisocyanate (B) and 0.1 to 1.5 equivalents of a hydroxyl group included in the hydroxyl group-containing (meth)acrylate (C) are used for one equivalent of the hydroxyl group included in the glycol (A1) and the polyol (A2).

The number average molecular weight of the urethane (meth)acrylate oligomer used in the composition of the present invention is preferably in the range from 1200 to 20,000, and more preferably from 2,200 to 10,000. If the number average molecular weight of the urethane(meth)acrylate is less than 1200, the resin composition tends to solidify; on the other hand, if the number average molecular weight is larger than 20,000, the viscosity of the composition becomes high, making handling of the composition difficult.

The urethane(meth)acrylate oligomer is preferably used in an amount from 10 to 90 wt %, more preferably from 20 to 80 wt %, even more preferably from 30 to 70 wt. %, and most preferred from 40 to 70 wt. % of the total amount of the resin composition. When the composition is used as a coating material for optical fibers, the range from 20 to 80 wt. % is particularly preferable to ensure excellent coatability, as well as superior flexibility and long-term reliability of the cured coating.

A liquid curable resin composition suitable to be applied as primary coating layer on an optical fiber according to the present invention can be cured by radiation. Here, radiation includes infrared radiation, visible rays, ultraviolet radiation, X-rays, electron beams, α-rays, β-rays, γ-rays, and the like. Visible and UV radiation are preferred.

The liquid curable resin composition suitable to be applied as a primary coating layer on an optical fiber according to the present invention preferably comprises a photo-polymerization initiator. In addition, a photosensitizer can be added as required. Given as examples of the photo-polymerization initiator are 1-hydroxycyclohexylphenyl ketone, 2,2-dimethoxy-2-phenylaceto-phenone, xanthone, fluorenone, benzaldehyde, fluorene, anthraquinone, triphenylamine, carbazole, 3-methylaceto-phenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropyl-phenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxy-benzoyl)-2,4,4-trimethylpentylphosphine oxide, bis-(2,4,6-trimethylbenzoyl)-phenylphosphine oxide and the like.

Examples of commercially available products of the photo-polymerization initiator include Irgacure® 184, 369, 651, 500, 907, CGI1700, 1750, 1850, 819, Darocur® 116, 1173 (manufactured by Ciba Specialty Chemicals Co., Ltd.), Lucirin® LR8728 (manufactured by BASF), Ebecryl® P36 (manufactured by UCB), and the like.

The amount of the polymerization initiator used can range from 0.1 to 10 wt %, and preferably from 0.5 to 7 wt %, of the total amount of the components for the resin composition.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox® 1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin® P, 234, 320, 326, 327, 328, 329, 213 (manufactured by Ciba Specialty Chemicals Co., Ltd.), Seesorb® 102, 103, 110, 501, 202, 712, 704 (manufactured by Sypro Chemical Co., Ltd.), and the like; examples of light stabilizers include Tinuvin® 292, 144, 622LD (manufactured by Ciba Specialty Chemicals Co., Ltd.), Sanol® LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxysilane, and methacryloxypropyl-tri-methoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.).

The primary coating compositions suitable to be applied as a primary coating layer on an optical fiber according to the present invention, when cured, typically have an elongation greater than 80%, more preferably of at least 110%, more preferably at least 150% but not typically higher than 400%.

The compositions suitable to be applied as a primary coating layer on an optical fiber according to the present invention will preferably have a cure speed of 1.0 J/cm$^2$ (at 95% of maximum attainable modulus) or less, more preferably about 0.7 J/cm$^2$ or less, and more preferably, about 0.5 J/cm$^2$ or less, and most preferred, about 0.4 J/cm$^2$ or less.

An exemplary typical formulation of a cross-linkable system for primary coatings according to the present invention comprises from 20 to 40 wt % of (meth)acrylate monomers esterified with branched alcohols having from 9 to 12 carbon atoms, from 40 to 70 wt % of urethane(meth)acrylate oligomer, from 1 to 5% by weight of photoinitiator and from 0.5 to 5% by weight of other additives, based on the total weight of the composition.

Typically, the polymeric material forming the primary coating has a modulus E' at 25° C. of from about 0.5 MPa to about 4 MPa.

The thickness of the primary coating typically ranges from about 25 μm to about 35 μm. Alternatively, when a fiber having a 125 μm diameter glass portion (i.e. similar to the one of conventional fibers), coated by coating layers having reduced overall thickness, e.g. for an overall external diameter of less than or equal to 210 μm, is desired, the thickness of the primary coating layer can be of from about 18 μm to 28 μm, preferably of 22-23 μm.

An optical fiber according to the invention comprises a second layer of polymeric material (secondary coating) which is disposed to surround said first layer (primary coating). Preferably, the polymeric material of said secondary coating is also based on a radiation curable composition. The above described primary coating is then in turn coated with a secondary coating, of a type known in the art, compatible with the primary coating formulation.

According to the invention, the radiation curable composition for said secondary coating comprises from 0.8% to 1.5%, preferably from 1.0% to 1.4%, by weight of silica, based on the total weight of the composition.

Any form of silica known in the art can be used according to the invention, such as, for example, synthetic silica, amorphous silica, silica gel, silica aerogel, precipitated silica, fumed silica, or colloidal silica, and mixture thereof. Colloidal silica is preferred.

Typically, an acrylic based secondary coating comprises at least one oligomer with acrylate or methacrylate terminal groups, at least one acrylic monomer and at least one photoinitiator.

The oligomer represents generally 40-80% of the formulation by weight. The oligomer is commonly a polyurethane acrylate.

The polyurethane acrylate is prepared by reaction between a polyol structure, a polyisocyanate and a monomer carrying the acrylic function.

The molecular weight of the polyol structure is indicatively between 500 and 6000 daltons; it can be entirely of hydrocarbon, polyether, polyester, polysiloxane or fluorinated type, or be a combination thereof.

The hydrocarbon and polyether structure and their combinations are preferred. A structure representative of a polyether polyol can be, for example, polytetramethylene oxide, polymethyltetramethylene oxide, polymethylene oxide, polypropylene oxide, polybutylene oxide, their isomers and their mixtures. Structures representative of a hydrocarbon polyol are polybutadiene or polyisobutylene, completely or partly hydrogenated and functionalized with hydroxyl groups.

The polyisocyanate can be of aromatic or aliphatic type, such as, for instance, a polyisocyanate (B) as previously described.

The monomer carrying the acrylic function comprises groups able to react with the isocyanic group. Said monomer can be selected, for instance, among the hydroxyl group-containing (meth)acrylates (C) as previously illustrated.

The epoxyacrylate is prepared by reacting the acrylic acid with a glycidylether of an alcohol, typically bisphenol A or bisphenol F.

The acrylic monomer represents 20-50% of the formulation by weight, its main purpose being to cause the formulation to attain a viscosity of about 5 Pas at the secondary coating application temperature. The acrylic monomer has a structure compatible with that of the oligomer. The acrylic monomer can contain an alkyl structure, such as isobornylacrylate, hexanediacrylate, dicyclopentadieneacrylate, trimethylolpropanetriacrylate, or aromatic such as nonylphenyletheracrylate, polyethyleneglycol-phenyletheracrylate and acrylic derivatives of bisphenol A.

A photoinitiator, such as those previously illustrated is preferably added to the composition. Further additives, such as inhibitors inhibiting polymerization by the effect of temperature, light stabilizers, leveling agents and detachment promoters can also be added An exemplary formulation of a cross-linkable system for secondary coatings comprises from 40 to 70% by weight of polyurethaneacrylate, epoxyacrylate or their mixtures, from 30 to 50% by weight of diluent monomer, from 1 to 5% by weight of photoinitiator and from 0.5 to 5% by weight of other additives, based on the total weight of the composition.

The fibres obtained thereby can be used either as such within optical cables, or can be combined, for example in ribbon form, by incorporation into a common polymer coating, of a type known in the art (such as Cablelite® 3287-9-53, DSM), to be then used to form an optical cable.

Typically, the polymeric material forming the secondary coating has a modulus E' at 25° C. of from about 1000 MPa to about 2000 MPa and a glass transition temperature (measured as above defined) higher than about 30° C., preferably higher than 40° C. and more preferably higher than about 50° C.

The thickness of the secondary coating typically ranges from about 10 μm to about 30 μm. Alternatively, when a fiber having a 125 μm diameter glass portion (i.e. similar to the one of conventional fibers), coated by coating layers having reduced overall thickness, e.g. for an overall external diameter of less than or equal to 210 μm, is desired, the thickness of the secondary coating is of from 10 μm to 20 μm, preferably of 15 μm.

Figure 2:
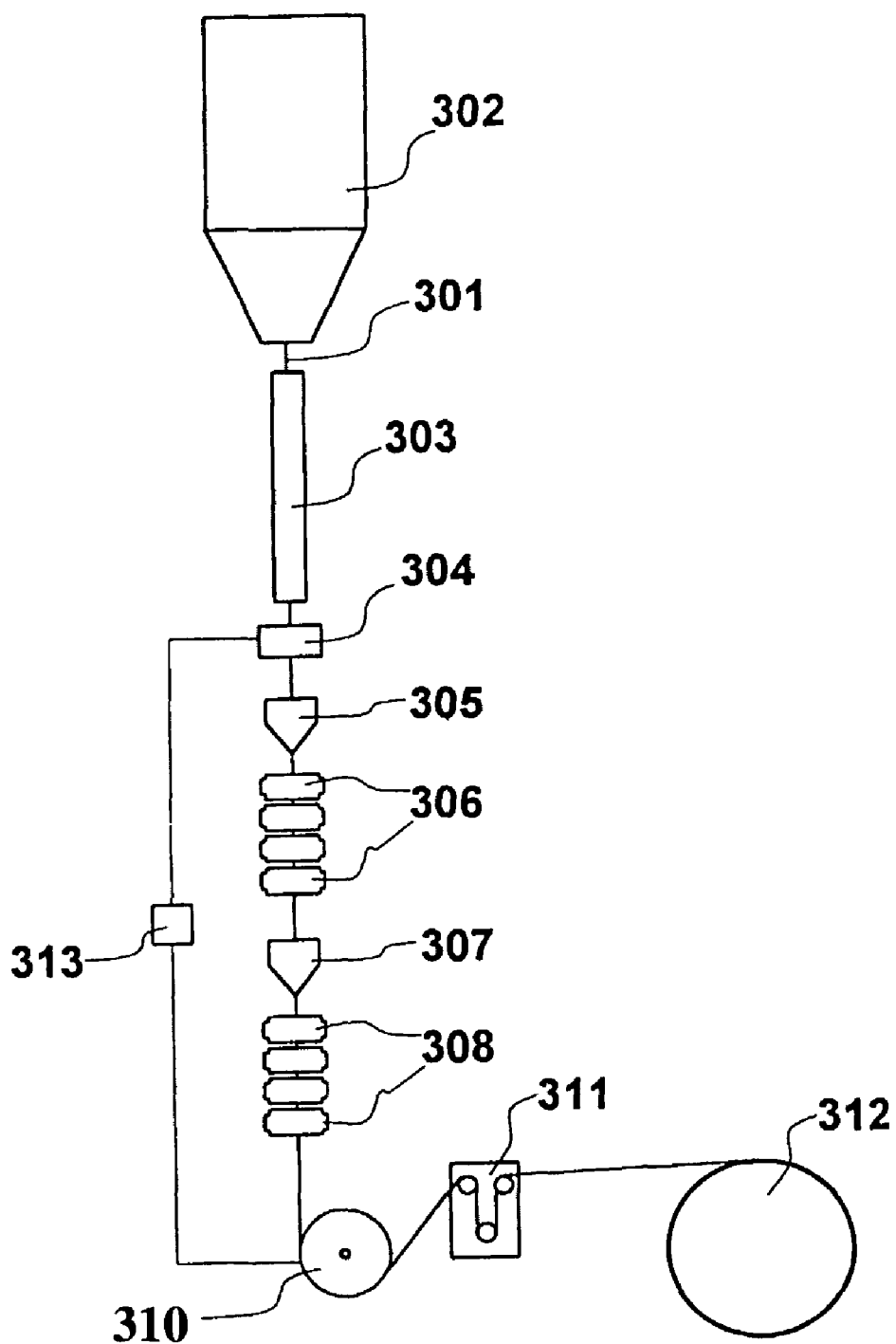
FIG. 2 shows an illustrative embodiment of a drawing tower for manufacturing an optical fiber according to the invention.

An optical fiber according to the present invention may be produced starting from a glass preform according to the usual drawing techniques, using, for example, a system such as the one schematically illustrated in FIG. 2.

This system, commonly known as "drawing tower", typically comprises a furnace (302) inside which a glass optical preform to be drawn is placed. The bottom part of the said preform is heated to the softening point and drawn into an optical fiber (301). The fiber is then cooled, preferably to a temperature of at least 60° C., preferably in a suitable cooling tube (303) of the type described, for example, in patent application WO 99/26891, and passed through a diameter measurement device (304). This device is connected by means of a microprocessor (313) to a pulley (310) which regulates the spinning speed; in the event of any variation in the diameter of the fiber, the microprocessor (313) acts to regulate the rotational speed of the pulley (310), so as to keep the diameter of the optical fiber constant. Then, the fiber passes through a primary coating applicator (305), containing the coating composition in liquid form, and is covered with this composition to a thickness of, for example, 25 μm-35 μm. The coated fiber is then passed through a UV oven (or a series of ovens) (306) in which the primary coating is cured. The fiber coated with the cured primary coating is then passed through a second applicator (307), in which it is coated with the secondary coating and then cured in the relative UV oven (or series of ovens) (308). Alternatively, the application of the secondary coating may be carried out directly on the primary coating before the latter has been cured, according to the "wet-on-wet" technique. In this case, a single applicator is used, which allows the sequential application of the two coating layers, for example, of the type described in U.S. Pat. No. 4,474,830. The fiber thus coated is then cured using one or more UV ovens similar to those used to cure the individual coatings.

Subsequent to the coating and to the curing, the fiber may optionally be caused to pass through a device capable of giving a predetermined torsion to this fiber, for example of the type described in WO07/073754, for the purpose of reducing the PMD ("Polarization Mode Dispersion") value of this fiber. The pulley (310) placed downstream of the devices illustrated previously controls the spinning speed of the fiber. After this drawing pulley, the fiber passes through a device (311) capable of controlling the tension of the fiber, of the type described, for example, in EP 1 112 979, and is finally collected on a reel (312).

An optical fiber thus produced may be used in the production of optical cables. Within such cables, the fiber may be used either as such or in the form of ribbons comprising several fibers combined together by means of a common coating.

EXAMPLES

The present invention will be explained in more detail below by way of examples, which are not intended to be limiting of the present invention.

Preparation of Optical Fibers

Double coated optical fibers were manufactured according to standard drawing techniques, by applying a first (primary) coating composition on the drawn optical fiber, curing said coating composition and subsequently applying the secondary coating layer and curing it. The fiber was drawn at a speed of about 20 m/s and the cure degree of the coating layers is of at least 90%. The cure degree is determined by means of MICRO-FTIR technique, by determining the percentage of the reacted acrylate instaurations in the final cross-linked resin with respect to the initial photo-curable composition.

The addition of silica particles to the second coating composition was carried out by ultrasound bath at 60° C. for 24 hrs. The mixture was left to stand for 12 hrs in order to eliminate the bubbles.

TABLE 1

| Fiber | Primary coating | Secondary coating | Silica (wt %) |
|---|---|---|---|
| F1* | DeSolite® 3471-1-152A | DeSolite® 3471-2-136 | 0 |
| F2 | DeSolite® 3471-1-152A | DeSolite® 3471-2-136 | 1 |
| F3* | DeSolite® 6D1-78 | DeSolite® 3471-2-136 | 0 |

The fiber groups marked by asterisk are comparative.

DeSolite® 3471-1-152A: commercially available product (sold by DSM Desotech), comprising about 60 wt % of urethane acrylate oligomer having a backbone of polyoxytetramethylene glycol, about 25-30 wt % of acrylates of $C_{10}$-$C_{11}$ branched alcohols, about 10 wt % of glycidyl derivatives, and a photoinitiator (Irgacure® 184 and 819).

DeSolite® 3471-2-136: commercially available product (sold by DSM Desotech), comprising about 60 wt % of a polyurethane acrylate.

DeSolite® 6D1-78: commercially available product (sold by DSM Desotech) comprising about 56 wt % of urethane isocyanate IDPI-PPG-IDPI (IDPI=isoforondiisocyanate; PPG=polypropylene glycol), about 16 wt % of acrylates of $C_{16}$-$C_{18}$ linear alcohols, about 13 wt % of oxyethylene glycidyl derivative and a photoinitiator (Irgacure® 184 and 819).

CabOSil® H5: synthetic, amorphous, colloidal silicon dioxide having an average particle (aggregate) length is 0.2-0.3 microns (sold by Cabot Corporation).

Static Fatigue Tests

The optical fibers of Table 1 were tested with static and fatigue measurements at 45° C. and 85% moisture.

The measurements have been performed according to the following specification: Measuring methods for mechanical characteristics IEC 60793-1-3 section B7E (2000): Method for measuring static fatigue parameter of optical fibers by uniform bending.

This method is intended to test static fatigue behavior of fibers by using different bend diameters. Precision mandrels of different diameters were used. The fiber length (1 m) to be tested was gripped at both ends by little bodkins.

The winding force, needed to ensure that the fiber touches the mandrel throughout its entire length was 0.25 N. Fifteen samples were tested at a given nominal stress level. The optical detection was used to monitor the time to fracture. A minimum of four different nominal stress levels was tested. The nominal stresses have been chosen such that the median times to fracture ranged from about 1 hour to about 30 days.

The results of the static fatigue test on double coated optical fibers F1*, F2 and F3* are reported in the following Tables 2 to 4 reporting the mean time to failure (MTTF) and the fracture time (a) at the stress caused by the different bending diameter

TABLE 2

| Optical fiber F1* | | | |
|---|---|---|---|
| Mandrel diameter | Stress (GPa) | MTTF (hr) | α (hr) |
| 2.7 | 3.348 | 1.970 | 2.220 |
| 2.8 | 3.229 | 4.052 | 4.560 |
| 2.9 | 3.118 | 6.352 | 7.170 |
| 3.3 | 2.740 | 228.240 | 257.420 |

TABLE 3

| Optical fiber F2 | | | |
|---|---|---|---|
| Mandrel diameter | Stress (GPa) | MTTF (hr) | α (hr) |
| 2.7 | 3.348 | 1.910 | 2.120 |
| 2.8 | 3.229 | 3.690 | 4.010 |
| 2.9 | 3.118 | 8.820 | 9.629 |
| 3.3 | 2.740 | 233.690 | 263.330 |

TABLE 4

| Optical fiber F3* | | | |
|---|---|---|---|
| Mandrel diameter | Stress (GPa) | MTTF (hr) | α (hr) |
| 2.7 | 3.348 | 1.61 | 1.69 |
| 2.8 | 3.228 | 3.98 | 4.08 |
| 2.9 | 3.117 | 5.5 | 5.09 |
| 3.3 | 2.740 | 37.41 | 40.52 |

While fiber groups F1* and F2 seem to have a similar resistant to the static fatigue in heat damp condition, fiber group F3* is remarkably more fragile at the test condition.

The stress corrosion susceptibility parameter n for each double coated optical fiber F*1, F2 and F*3 was calculated and is reported in the following Table 5.

TABLE 5

| Fiber | n |
|---|---|
| F1* | 22.706 |
| F2 | 25.506 |
| F3* | 15.088 |

The value n calculated for optical fiber F3* allowed to obtain a MTTF lower than 1 month in damp heat conditions (85% Relative Humidity and 45° C.) at a bending radius of 4 mm.

The value n calculated for optical fiber F1* allowed to obtain a MTTF slightly higher than one year in damp heat conditions (85% Relative Humidity and 45° C.) at a bending radius of 4 mm.

The value n calculated for optical fiber F2 of the present invention allowed obtaining a MTTF higher than five year in damp heat conditions (85% Relative Humidity and 45° C.) at a bending radius of 4 mm.

The invention claimed is:
1. An optical fiber comprising an optical waveguide, a first coating layer disposed to surround said optical waveguide and a second coating layer disposed to surround said first coating layer, wherein
said first coating layer comprises a cured polymeric material obtained by curing a radiation curable composition comprising at least one (meth)acrylate monomer esterified with at least one branched alcohol having from 9 to 12 carbon atoms, and said second coating layer comprises a cured polymeric material obtained by curing a radiation curable (meth) acrylate composition comprising from 0.8% to 1.5% by weight of silica, based on the total weight of the composition.

2. The optical fiber according to claim 1, wherein said first coating layer comprises a cured polymeric material obtained by curing a radiation curable composition comprising (i) at least one (meth)acrylate monomer esterified with at least one branched alcohol having from 9 to 12 carbon atoms, and (ii) a radiation curable urethane(meth)acrylate oligomer.

3. The optical fiber according to claim 2, wherein said radiation curable urethane(meth)acrylate oligomer comprises a backbone derived from a polyalkylene glycol and a dimer acid based polyester polyol.

4. The optical fiber according to claim 1 wherein said branched alcohol is selected from aliphatic alcohols.

5. The optical fiber according to claim 1, wherein said branched alcohol has from 10 to 11 carbon atoms.

6. The optical fiber according to claim 1, wherein said (meth)acrylate monomer is selected from nonyl(meth)acrylate, decyl(meth)acrylate, undecyl(meth)acrylate, dodecyl(meth)acrylate, isodecyl(meth)acrylate, isobornyl(meth)acrylate, bornyl(meth)acrylate, cyclohexylbutyl(meth)acrylate, cyclohexylpentyl(meth)acrylate, cyclohexylhexyl(meth)acrylate, 2-hydroxydecyl(meth)acrylate, dimethyloctyl(meth)acrylate, trimethyloctyl(meth)acrylate, 2,6-dimethylheptan-4-yl(meth)acrylate, 3,5,5-trimethylhexan-1-yl(meth)acrylate, 6,8-dimethylnonan-2-yl(meth)acrylate, 5,7,7-trimethyloctan-1-yl(meth)acrylate, 2,4,4-trimethylheptan-3-yl(meth)acrylate, arylbutyl(meth)acrylate, arylpentyl(meth)acrylate, and arylhexyl(meth)acrylate.

7. The optical fiber according to claim 1, wherein said radiation curable composition of said first coating layer comprises from 1 to 80 wt. %, based on the total weight of the composition, of said at least one (meth)acrylate monomer esterified with said at least one branched alcohol.

8. The optical fiber according to claim 7, wherein said radiation curable composition of said first coating layer comprises from 10 to 60 wt. % based on the total weight of the composition, of said at least one (meth)acrylate monomer esterified with said at least one branched alcohol.

9. The optical fiber according to claim 8, wherein said radiation curable composition of said first coating layer comprises from 20 to 55 wt. %, based on the total weight of the composition, of said at least one (meth)acrylate monomer esterified with said at least one branched alcohol.

10. The optical fiber according to claim 1, wherein said radiation curable composition of said first coating layer comprises from 20 to 40 wt. % of (meth)acrylate monomers esterified with branched alcohols having from 9 to 12 carbon atoms, from 40 to 70 wt. % of urethane(meth)acrylate oligomer, from 1 to 5% by weight of photoinitiator and from 0.5 to 5% by weight of other additives, based on the total weight of the composition.

11. The optical fiber according to claim 1, wherein said radiation curable composition of said second coating layer comprises from 1.0% to 1.4% by weight of silica, based on the total weight of the composition.

12. The optical fiber according to claim 1, wherein said silica is selected from synthetic silica, amorphous silica, silica gel, silica aerogel, precipitated silica, fumed silica, colloidal silica, and mixtures thereof.

13. The optical fiber according to claim 12, wherein said silica is colloidal silica.

14. The optical fiber according to claim 1, wherein said radiation curable composition of said second coating layer comprises from 40 to 70% by weight of polyurethaneacrylate, epoxyacrylate or their mixtures, from 30 to 50% by weight of diluent monomer, from 1 to 5% by weight of photoinitiator and from 0.5 to 5% by weight of other additives, based on the total weight of the composition.

* * * * *